United States Patent [19]
Hirashima

[11] 3,821,761
[45] June 28, 1974

[54] PHOTOGRAPHIC CAMERA WITH DEVELOPING MEANS

[75] Inventor: Masayoshi Hirashima, Ibaraki, Japan

[73] Assignee: Matsushita Electric Industrial Co., Ltd., Kadoma City, Osaka Prefecture, Japan

[22] Filed: Sept. 22, 1972

[21] Appl. No.: 291,356

[30] Foreign Application Priority Data
- Sept. 27, 1971 Japan.............................. 46-75679
- Sept. 27, 1971 Japan.............................. 46-75680
- Oct. 3, 1971 Japan.............................. 46-77305

[52] U.S. Cl. ........................................ 95/13, 95/14
[51] Int. Cl. ........................................ G03b 17/55
[58] Field of Search ................. 95/13, 14; 431/326

[56] References Cited
UNITED STATES PATENTS
| 731,069 | 6/1903 | Plummer............................ 431/326 |
| 1,682,931 | 9/1928 | Pifer................................... 95/14 X |
| 2,627,306 | 2/1953 | Stadd................................ 431/326 |
| 2,751,814 | 6/1956 | Limberger............................. 95/14 |

FOREIGN PATENTS OR APPLICATIONS
| 1,030,557 | 5/1966 | Great Britain..................... 355/106 |
| 1,176,183 | 11/1958 | France................................. 95/13 |

Primary Examiner—John M. Horan
Attorney, Agent, or Firm—Wenderoth, Lind & Ponack

[57] ABSTRACT

A photographic camera, having an optical system comprising an objective lens and a shutter, is provided with a built-in heating means for developing a thermo-developing photosensitive film or paper so as to develop a latent image formed by an exposure through the optical system, which heating means utilizes benzine or butane as fuel and is ignited for combustion by an electric heater or an electric spark.

9 Claims, 8 Drawing Figures

PHOTOGRAPHIC CAMERA WITH DEVELOPING MEANS

BACKGROUND OF THE INVENTION

A camera with which a photograph is taken to form a latent image on a photographic film which is then developed in the camera to form a visible image thereon has been known. In such conventional photograph-and-develop cameras, the development is made by a conventional chemical development employing a small amount of developing liquid preserved in small packs arranged for respective frames of the photographic films. In such conventional photograph-and-develop cameras, the cost of finishing a frame of photography is very expensive since such camera uses a special instant developable film provided with the packs of the developing liquid for each frame.

SUMMARY OF THE INVENTION

The present invention relates to a novel camera with which a photograph is taken and then is developed without using developing liquid.

The present invention concerns a photographic camera in which a photograph is made by using a thermo-developing photographic film or a thermo-developing photoprinting paper.

The main object of the present invention is to provide a novel photographic camera capable of photographing and subsequent developing therein utilizing rather inexpensive photosensitive film.

The other object of the present invention is to provide a novel photographic camera having an optical system comprising an objective lens and a shutter, which camera is characterized by having a built-in heating means for developing a thermo-developing photographic film so as to develop a latent image formed by an exposure through the optical system.

DETAILED DESCRIPTION OF THE INVENTION

Figure 1:
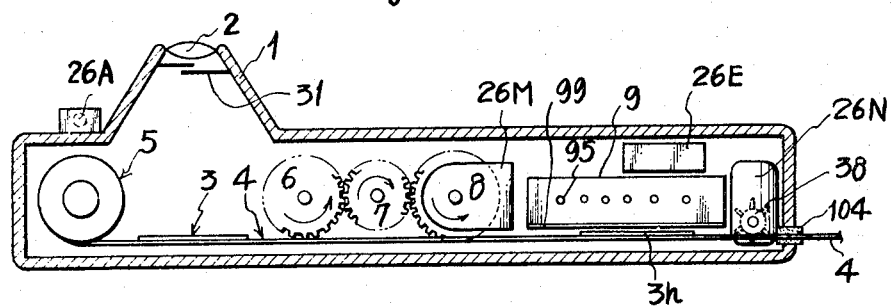
FIG. 1 is a sectional bottom view of a camera embodying the present invention.
Figure 2:
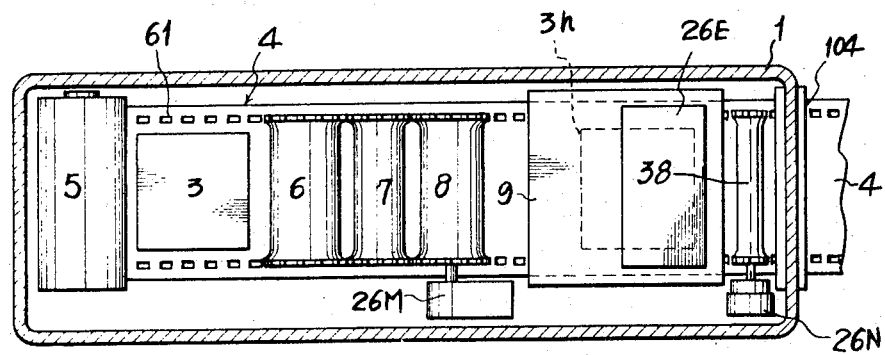
FIG. 2 is a sectional vertical view of the camera of FIG. 1.

In FIG. 1 and FIG. 2 which show a first example of the present invention, an optical system, comprising an objective lens 2 and a shutter 31, is provided at the front part of a dark box 1. A magazine 5, which contains certain pieces of thermo-developing photosensitive paper 3 arranged at specified intervals on a holder 4 of a long sheet of paper or plastic material, is held in the dark box 1 in a conventional way. The holder 4 has perforations 61 along both edges for engagement with detents of sprockets 6 and 8, so that the holder is shifted when the sprocket wheels 6 and 8 revolve as shown by arrows. The paper also has cutting-off perforations 12 for taking out developed pieces. A gear 7 is used for synchronizing the sprockets 6 and 8 to each other. A heating means or burner 9 is provided in the dark box 1 for heating by combustion and thereby developing the photosensitive paper 3. The interval between the adjoining pieces of photo-sensitive paper 3 is selected to conform to the distance between the exposure position and the thermo-developing position. A dry cell 26E is provided in order to ignite the burner 9 for the combustion. The dark box 1 has an outlet 104 for taking out therefrom the developed piece of photosensitive paper 3 by pulling out the holder 4. The outlet 104 is provided with known light-shielding means comprising, for instance, black elastic material. Other parts known in the conventional photographic camera are omitted from the drawing and description.

For said thermo-developing type photosensitive paper, there can be used a known paper having a photosensitive layer containing a small amount of silver halide (AgX), long-chain fatty acid ($CH_3(CH_2)_nCOOAg$) and a weak reducer (hydroquinone). One example of such paper available in the market is a type 744 photosensitive paper produced by Minnesota Mining and Manufacturing Company of the United States. The a type 744 photosensitive paper has a photosensitivity of about ASA 10 and is far lower in price than the conventional instant developable papers with photosensitive layer containing mainly silver halide.

By opening the shutter 31 for a specified short period by handling a shutter release button 26A, a light coming through the lens imparts a real light image on the photosensitive paper 3 and forms a latent image thereon. Then, the holder 4 is advanced by relation of the gears 6 and 8 towards the outlet 104, so that the exposed photosensitive paper 3 reaches a heating position 3h facing the heating means 9. At the heating position 3h, the photosensitive paper 3 is heated by the heating means 9 to about 130° C for about 10 seconds, so as to change the latent image to a visible image. When using said type 744 photosensitive paper, the visible image thus obtained is negative. However, if an object to be photographed is characters or charts, a negative photograph itself may be used.

One practical example of the heating means is a benzine burner with a catalyst-carrying mat in a combustion space and with an igniting heater arranged adjacent to the catalyst-carrying mat. Such kind of benzine burner with electric igniting means is known, for instance, by the U.S. Pat. specification No. 3,452,908 (Patented on July 29, 1969; Body Warmer).

Another practical example of the heating means is a butane burner with an electric igniter. Such butane burner is known as a gas cigarette-lighter.

In the burner 9, a heat-conducting plate 99, namely, a metal plate is provided between the photosensitive paper 3 in the developing position and a burning room of the burner 9, so that the metal plate 99 receives the heat of combustion on one face thereof and transfers the heat to the photosensitive film 3 contacting the other face thereof. Also air holes 95 for taking in fresh air and sending out exhaust gas are provided in the burner 9, in such a manner that they only permit passing of air without leaking of light into the dark box 1. The heating means takes several seconds from ignition until attaining a predetermined developing temperature, and accordingly, the ignition may be made a few seconds earlier than the photosensitive paper 3 arrives at the developing position. Therefore, the igniting means may be constituted to interlock with the advancing sprockets 6 and 8, so that the ignition takes place symultaneously with the start of advance of the photosensitive paper 3, and that the burner starts burning several seconds earlier than the photosensitive paper 3 arrives at the heat-conducting plate 99.

Figure 4:
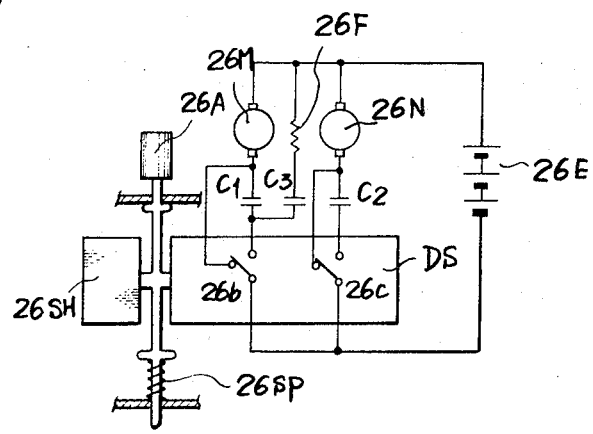
FIG. 4 is an electric circuit diagram of the camera of FIGS. 1 and 2 shown with relevant mechanical parts.

The advancing means can be of manual operation. However, for easier handling and better results, the advancing means may be constituted of an automatic system comprising an electric motor. One example of an electric circuit of such automatic system is shown in FIG. 4, wherein symbol 26A designates the shutter release button shown in FIG. 1 and 26SP designates a pushing back spring of the button. The button 26A is mechanically linked to a shutter releasing mechanism 26SH, details of which are omitted since they are known. The button 26A is also linked to a known delay switch DS, wherein a first switch 26$b$ closes after a short period from pressing the button 26A and a second switch 26$c$ closes after a considerable time from closing the switch 26$b$. The closed periods of the switches 26$b$ and 26$c$ are selected to be several seconds. A motor 26M for driving the paper advancing sprockets 6 and 8 to advance the paper from the exposure position to the developing position, a capacitor C1 for defining the period of rotation of the motor 26M and the switch 26$b$ are connected in series to each other across the dry cell 26E. Another motor 26N for driving a sprocket 38 for advancing the paper from the developing position towards an outlet 104 and further outside the dark box 1, a capacitor C2 for defining the period of rotation of the motor 26N, and the switch 26$c$ are connected in series to each other across the dry cell 26E. The igniting heater 26F and a capacitor C3 for defining the amount of electric energy to be given to the heater 26F are connected in series to each other across the series connection of the motor 26M and the capacitor C1.

Figure 5:
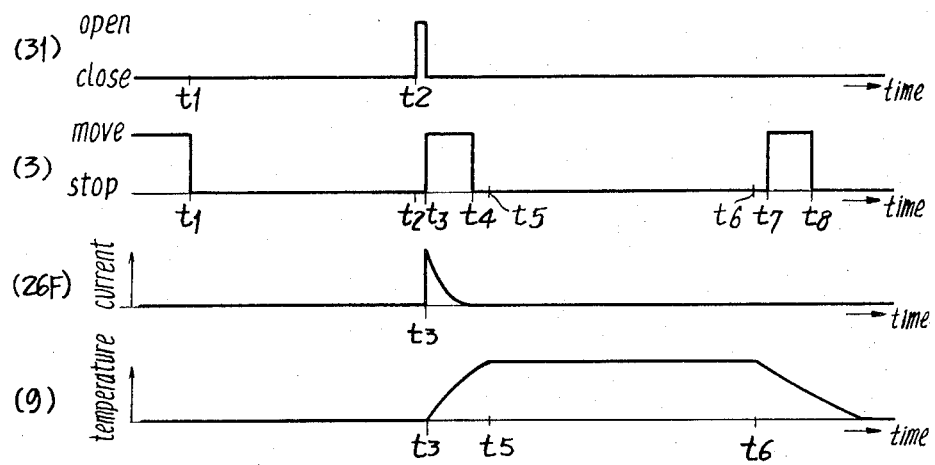
FIG. 5 is a time chart showing relations among motions of various parts of the camera.

The operation of the example illustrated by FIGS. 1 to 4 is explained hereunder referring to a time chart of FIG. 5.

In FIG. 5, symbols t1 to t8 indicate the following times:

$t1$ . . . the shutter 31 is charged up.
$t2$ . . . the shutter button 26A is pressed.
$t3$ . . . the motor 26M starts to rotate and the burner 9 is ignited.
$t4$ . . . the motor 26M stops when paper 3 reaches the developing position 3h.
$t5$ . . . the heat conducting plate 99 attains developing temperature.
$t6$ . . . the burner 9 stops its combustion.
$t7$ . . . the developed photosensitive paper 3 starts to be sent out of the outlet 104.
$t8$ . . . the sending-out of the developed paper is over.

When the shutter button 26A is pressed at the time $t2$, the shutter 31 opens for a preset short period and permits the light from an object coming through the lens 2 to form a latent image on the photosensitive paper 3 positioned in the exposure position under the lens 2. Then, after a short period defined by the delay switch DS, the switch 26$b$ is closed at the time $t3$. Accordingly, the dry cell 26E gives a current to the motor 26M through the capacitor C1. The current decreases and then stops at the time $t4$, since this is a transient current, and accordingly, the paper 3 stops at the developing position 3$h$ at the time $t4$. On the other hand, the igniting heater 26F receives igniting current from the time $t3$ through the capacitor C3, and then the burner 9 starts its combustion. Soon after the paper 3 reaches the developing position 3$h$, the heat-conducting plate 99 of the burner 9 attains developing temperature of about 130° C at the time $t5$. When the burner 9 stops its combustion at the time $t6$, the development is over. The stoppage of the burner is made by closing an air intake holes 95 by, for instance, manual operation or an electromagnet (not shown in the drawing). Then, at the time $t7$, the second switch 26$c$ closes, and the dry cell 26E gives a current to the motor 26N through the capacitor C2. In a manner similar to that described with respect to motor 26M, the motor 26N rotates for a predetermined period driving the sprocket 38. Accordingly, the holder 4 is cut off at the cutting perforations 12 and advanced to the outlet 104, and accordingly, the developed paper 3 held on the holder 4 is sent out of the outlet 104.

In a case where the burner requires a long time, ingition of the burner may be made to work symultaneously with the shutter charging at the time $t1$.

In a camera where the exposure time is always short relative to the paper advancing period, the first switch 26$b$ may be constituted to switch simultaneously with pressing the button 26A. Then, due to a delay in starting of the motor 26M from the closing of the switch 26$b$, the paper 3 can be made still during the short exposure.

Figure 6:
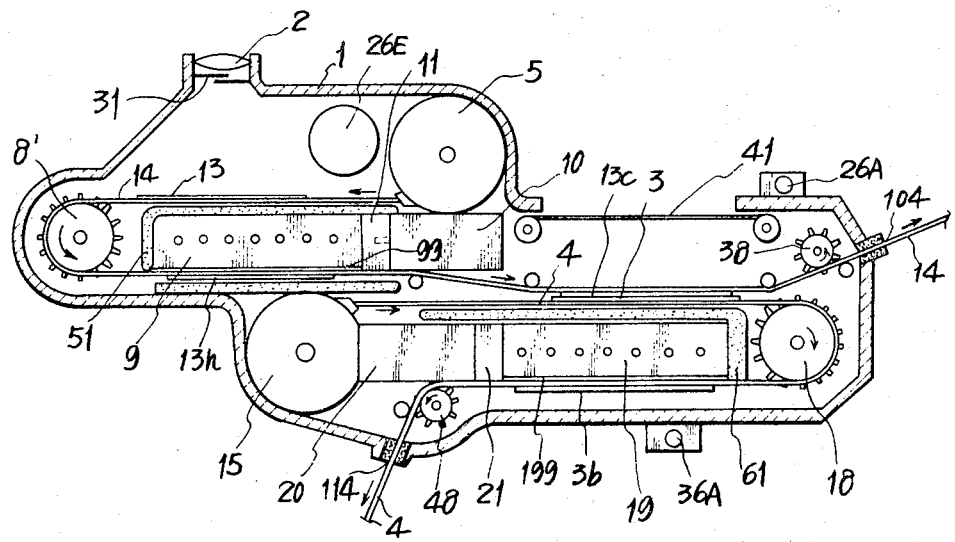
FIG. 6 is a sectional plan view of another camera embodying the present invention.
Figure 7:
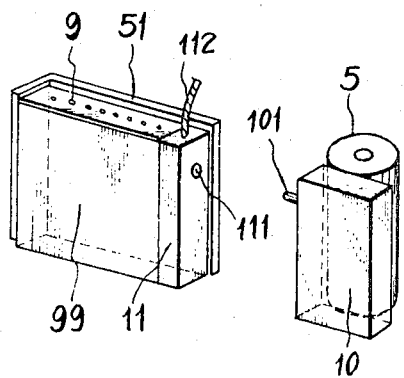
FIG. 7 is a perspective view showing some parts of the camera of FIG. 4.
Figure 8:
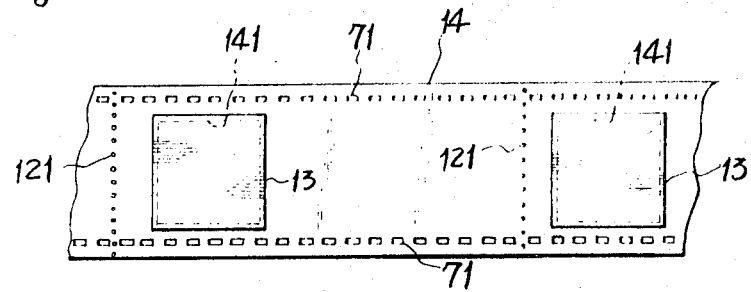
FIG. 8 is a plan view of a part of a photosensitive film for use in the camera of FIG. 6.

A second example capable of making a positive photographic picture is elucidated hereunder referring to FIGS. 6 to 8. In FIG. 6, the dark box 1 contains as principal elements a first magazine 5, a first heating means 9, a lens 2, a first shutter 31, a second magazine 15, a second heating means 19 and a second shutter 41. The first magazine 5 contains a holder 14 holding photosensitive film 13 with transparent film base at a predetermined interval. The holder 14 has windows 141 behind the films 13 which are secured to the holder 14 with their edges. Also, the holder 14 has perforations 71,71 near both edges to engage with the film advancing sprocket 8' and cutting-off perforations 121. The holder 14 and, hence, the films 13 are guided by the sprocket 8' to the heat-conducting plate 99 of the burner 9, further to the printing position behind the printing shutter 41, and finally to the outlet 104 through a sending-out sprocket 38. A heat insulator 51 is provided to insulate the heat conduction from the burner 9 to the film 3 at the exposing position and other adjoining parts. As is shown in FIG. 7, the burner 9 has a fuel controller unit 11 which controls the amount of the fuel supplied to the burner for each developing task by a known mechanism driven by a linking cable 112 connected to the shutter mechanism. An intake hole 111 is connected to the outlet pipe of the fuel tank 10 containing benzine of butane. The fuel tank 10 is permanently combined with the film magazine 5, so that an appropriate quantity of fuel for a preset a number of film pieces can be served with the film. Accordingly, there is no anxiety of shortage of fuel while film pieces still remain in the magazine. The outlet pipe 101 of the tank is constituted as a conventional valve whch is tightly closed when the connection to the hole 111 is disengaged. A first shutter release button 26A for operating the shutter 31, and motors for driving the film advancing sprocket 8' and film send-out sprocket 38, and an igniting heater in the burner 19 are mechanically and electrically associated with a similar manner as described referring to FIG. 4.

Figure 3:
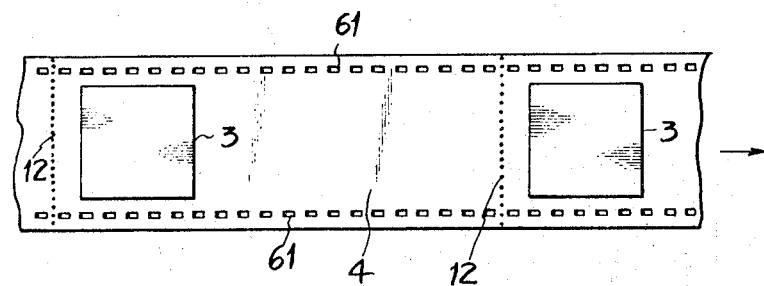
FIG. 3 is a plan view of a part of a photosensitive paper for use in the camera of the foregoing figures.

The second magazine 15 contains a holder 4 and pieces of photosensitive paper 3 which are identical to those shown in FIG. 3. The holder 4 and, hence, the paper 3 are guided by the sprocket 18 to the printing position and then to the heat-conducting plate 199 of the burner 19 and finally as to the outlet 114 through a secondary sprocket 48. A heat insulator 61 is provided to insulate the heat conduction from the burner 19 to the photosensitive paper 4 at the exposing position and other adjoining parts. The burner 19 has a fuel controller unit 21 which is connected to the fuel tank 20. The constitutions of the fuel controller 21 and the tank 20 are identical to those of the aforementioned controller 11 and the tank 10. The fuel tank 20 is permanently combined with the photosensitive-paper magazine 15 similarly to those indicated by 10 and 5. A second shutter release button 36A for operating the curtain type shutter 41 for printing the positive photography on the paper 3, as well as motors for driving the paper-advancing sprocket 18 and the paper send-out sprocket 48, and an igniting heater in the burner 19 are mechanically and electrically associated in a similar manner as described referring to FIG. 4. A common dry cell 26E feeds electric power to the circuits for both photography and positive printing.

The operation of the camera as set forth above is as follows:

When the shutter button 26A is pressed, the shutter 31 opens and permits the light from an object coming through the lens 2 to form a latent image on the photosensitive film 13 positioned in the exposure position under the lens 2. Then after a short period, the sprocket 8' rotates for a certain period and the exposed film is shifted to the developing position, namely, the position to face the heat-conducting plate 99. The film 3 is developed here, receiving the heat of about 130° from the plate 99, and a negative image appears on the film 13. Then, after completion of the development, the developed film 13 is shifted to the printing position 13c, where the photosensitive paper 3 is laid contacting behind the negative film 13. Then, by pressing the second shutter button 36A, the shutter 41 opens for a predetermined period and the photosensitive paper is exposed to the light coming through the negative film 13. Subsequently, the paper 3 is shifted by the rotation of the sprocket 18 to the developing position facing the heat-conducting plate 199, while the film 13 is sent out of the outlet 104 by the rotation of the sprocket 38. Then the paper 3 is developed by receiving the heat from the heat-conducting plate 199, and a positive image appears on the paper 3. Finally, the developed paper 3 is sent out of the outlet 114 by rotation of the sprocket 48.

Though the shutter-release buttons 26A and 36A are separately provided for photographing and for positive printing, respectively, in the camera of FIG. 6, the latter button 36A can be omitted by associating the two circuits in such a manner that the shutter 41 and the delay switch of the second circuit start their functions after a certain period from the completion of the motion of the first circuit.

What is claimed is:

1. A photographic camera comprising:
   a casing having an aperture therein and an exit means therein;
   an objective lens positioned in said aperture for projecting an image within said casing;
   a shutter means located within said casing and positioned for blocking said aperture to prevent the ingress of light through said objective lens in a normal position of said shutter means, said shutter means being capable of being activated to allow an image to be projected within said casing;
   an intermittently operated heating means located in said casing at a distance from said aperture and adapted for causing a picture to thermally develop after an image has been projected within said casing and recorded on a photosensitive film when said film is in proper position for development;
   a magazine for containing unexposed film, said magazine being mounted within said casing;
   at least one sprocket member means mounted within said casing, in operative engagement with said photosensitive film at a position intermediate said magazine and said heating means, for advancing said film in an intermittent manner past said objective lens whereby an image is projected onto said film, for thereafter conveying said film to said heating means for subsequently developing said image on the film, and for then separating said developed portion of said film from the remainder of said film and delivering said developed film portion to said exit means of said casing; and
   said intermittently operated heating means being operatively connected to said at least one sprocket member means, such that said heating means becomes activated as said at least one sprocket member means commences transferring film having an image thereon to said heating means whereby said heating means is warmed up to its operational temperature when said film arrives at said heating means for development.

2. The photographic camera of claim 1 wherein said heating means comprises a heat conduction plate positioned adjacent said photosensitive film;
   a liquid fuel burner member positioned adjacent said heat conduction plate opposite said film and capable of intermittent operation;
   and a fuel supply in communication with said burner member, said fuel supply comprised of a tank connected to said magazine and having an appropriate amount of fuel for providing sufficient heat for developing all the film stored in said magazine.

3. The photographic camera of claim 2 further comprising an automatic advancing means for advancing said film for being developed, said automatic advancing means being operatively coupled to said means for holding and guiding and including a first automatically operated switch operatively coupled to a drive circuit which first switch is activated by a shutter release mechanism which activation automatically advances said film to said heating means a predetermined time after said film has been exposed to an image, and a second automatically activated switch coupled to a drive circuit which second switch is activated a predetermined time after said film arrives at said heating means for transferring said film to said exit means.

4. The device of claim 3 wherein said second switch is activated approximately 10 seconds after said film arrives at said heating means.

5. A photographic camera for producing a positive image picture, comprising:
   a casing having a first and a second aperture and first and second exit means therein;
   an objective lens located in said first aperture for projecting an image within said casing;
   a first shutter means located within said casing and positioned for blocking said first aperture to prevent the ingress of light through said objective lens in a normal position of said shutter means, said shutter means being capable of being activated to allow an image to be projected within said casing;
   a first intermittently operating heating means positioned within said casing for developing said image subsequent to the projection of the image on said film;
   first means for holding and guiding a first photosensitive film operatively positioned within said casing for feeding said first photosensitive film in an intermittent manner past said objective lens whereby an image is projected on said film, for thereafter conveying said film to said first heating means for subsequently developing said image on said film, and for then transferring said film to an intermediate region and finally to said first exit means;
   second means for holding and guiding a second photographic film positioned within said casing, said second film being adjacent said first film in said intermediate region;
   second shutter means located within said casing and positioned for blocking said second aperture to prevent the ingress therethrough of light, said first film at said intermediate region being intermediate said second film and said second shutter means, said second shutter means being capable of being activated to expose said second film to said developed image from said first film;
   a second intermittently operated heating means located in said casing for thermally developing a picture on said second film subsequent to the projection of said developed image from said first film onto said second film;
   whereby said second means for holding and guiding transfers said developed second film having a positive image to said second exit means;
   first button operating means operatively connected to said first shutter means for selectively opening said first shutter means, said first button operating means further being operatively connected through time delay means to said first heating means and said first guiding means for activating after predetermined time periods said first heating means and said first guiding means; and
   second button operating means operatively connected to said second shutter means for selectively opening said second shutter means, said second button operating means further being operatively connected through time delay means to said second heating means and said second guiding means for activating after predetermined time periods said second heating means and said second guiding means.

6. The camera of claim 5 further comprising means for automaitcally advancing said first and second means for holding and guiding in a synchronous manner, operatively located in said casing and coupled to said means for holding and guiding.

7. The camera of claim 6 wherein said first and second means for holding and guiding each comprise a magazine for containing unexposed film, said magazine being mounted within said casing; and at least one sprocket member means mounted within said casing, in operative engagement with said respective photosensitive film at a position intermediate said respective magazine and said respective heating means, for advancing said film in an intermittent manner; and each of said intermittently operated heating means being operatively connected to the respective said at least one sprocket member means such that each of said heating means becomes activated as said respective at least one sprocket member means commences transferring the respective film having an image thereon to the respective said said heating means, whereby said respective heating means is warmed up to its operational temperature when said respective film arrives at said respective heating means for development.

8. The photographic camera of claim 7 wherein said first and second heating means both comprise a heat conduction plate positioned adjacent said respective photosensitive film, a liquid fuel burning member positioned adjacent said heat conduction plate opposite said film and capable of intermittent operation, and a fuel supply in communication with said burning member, said fuel supply comprising a tank connected to the respective said magazine and having an appropriate amount of fuel for providing sufficient heat developing all the film stored in said magazine.

9. The camera of claim 5, wherein said time delay means comprises a first delay switch connected between said first button operating means and said first heating means and said first guiding means, and a second delay switch connected between said second button operating means and said second heating means and said second guiding means.

* * * * *